United States Patent [19]

Sawyers

[11] Patent Number: 5,422,051
[45] Date of Patent: Jun. 6, 1995

[54] METHOD FOR RECYCLING PLASTIC INTO CEMENTITIONS BUILDING PRODUCTS

[76] Inventor: John P. Sawyers, 5505 2nd St., Lubbock, Tex. 79416

[21] Appl. No.: 162,897

[22] Filed: Dec. 8, 1993

Related U.S. Application Data

[63] Continuation-in-part of Ser. No. 82,739, Jun. 28, 1993, abandoned.

[51] Int. Cl.⁶ .................................................. B29B 17/02
[52] U.S. Cl. ................................................ 264/31; 264/37
[58] Field of Search ............... 106/692, 696, 697, 708, 106/719, 724, 689, 730, 802, 281.1; 264/37, 333, DIG. 69, 31

[56] References Cited

U.S. PATENT DOCUMENTS

| | | | |
|---|---|---|---|
| 1,986,591 | 1/1935 | Meyer | 106/280 |
| 1,991,319 | 2/1935 | Finley . | |
| 2,961,711 | 11/1960 | Diedrich et al. . | |
| 3,418,402 | 12/1968 | Grissom et al. | 52/DIG. 9 |
| 3,734,988 | 5/1973 | Aintablian . | |
| 3,778,397 | 12/1973 | Gannon et al. | 106/280 |
| 3,801,358 | 4/1974 | Steinberg et al. | 52/DIG. 9 |
| 3,819,456 | 6/1974 | Enfield . | |
| 3,892,706 | 7/1975 | Jetzer . | |
| 3,907,582 | 9/1975 | Walter | 106/280 |
| 3,941,607 | 2/1976 | Schuhbauer et al. | 106/280 |
| 3,955,992 | 6/1976 | Roberts . | |
| 4,034,861 | 7/1977 | Fontein et al. . | |
| 4,058,406 | 11/1977 | Raponi . | |
| 4,250,136 | 2/1981 | Rex | 264/DIG. 6 |
| 4,427,818 | 1/1984 | Prusinski | 524/442 |
| 4,795,603 | 1/1989 | Nagayasu | 264/DIG. 69 X |
| 5,073,416 | 12/1991 | Arakian et al. | 428/412 |
| 5,075,057 | 12/1991 | Hoedl . | |
| 5,080,291 | 1/1992 | Bloom . | |
| 5,094,905 | 3/1992 | Murray . | |
| 5,106,554 | 4/1992 | Drews . | |
| 5,302,331 | 4/1994 | Jenkins | 264/115 |

FOREIGN PATENT DOCUMENTS

| | | | |
|---|---|---|---|
| 67958/74 | 10/1975 | Australia . | |
| 2605132 | 8/1976 | Germany . | |
| 0030608 | 8/1972 | Japan | 106/696 |
| 52-29704 | 8/1977 | Japan . | |
| 0334199 | 4/1972 | U.S.S.R. | 106/708 |
| 0833708 | 6/1981 | U.S.S.R. | 106/697 |

OTHER PUBLICATIONS

Christian Science Monitor, Reproduced in *Washington Home*, (Oct. 1991) p. 5.

*Primary Examiner*—Christopher A. Fiorilla
*Attorney, Agent, or Firm*—Richard Litman

[57] ABSTRACT

Plastic materials are collected from discarded articles or manufacturing stock, reduced to particles, and mixed with feedstock for manufacturing building materials, such as concrete. Particle maximum dimensions are preferably in the range of five to ten millimeters. The recycled plastic includes up to twenty-five per cent, by volume, of the building material. This provides economical and ecologically sound disposal of otherwise waste plastic, and improves the building material into which it has been incorporated. Cost of the building material is reduced. A cementitious concrete made from recycled plastics, portland cement, and sand/gravel fillers performs to standards of concretes made without plastics. Heterogeneous plastic materials may be used in this concrete, removing the previously time and resource intensive step of sorting and melting down constituent plastics from each other in the waste stream.

9 Claims, 1 Drawing Sheet

METHOD FOR RECYCLING PLASTIC INTO CEMENTITIONS BUILDING PRODUCTS

CROSS-REFERENCE TO RELATED APPLICATIONS

This application is a Continuation-In-Part of related U.S. application Ser. No. 08/082,739, filed Jun. 28, 1993, now abandoned.

BACKGROUND OF THE INVENTION

1. Field of the Invention

The present invention relates to an improved aggregate building material employing recycled plastic waste.

2. Description of the Prior Art

Presently, plastics which are recycled are separated into constituent types of plastics which are then individually melted down before they can be reused. This requires vast amounts of man hours and processing time. Accordingly, only a small fraction of plastics used are recycled, the rest going into landfills, incinerators, and dumps. There is clearly a long-felt need for a way to reuse plastics without requiring such extensive effort and processing. The incorporation of plastics into building materials has been described in the prior art. For example, the improvement of an asphalt composition by inclusion therein of a prepared organic or plastic material is shown in U.S. Pat. Nos. 3,418,402, issued on Dec. 24, 1968 to Robert R. Grissom et al., and 3,778,397, issued on Dec. 11, 1973 to Charles R. Gannon et al. As taught in '397, plastic material may take the form of feedstock polymer or crumb rubber.

Incorporation of recycled solid wastes into a building material is taught in U.S. Pat. No. 3,801,358, issued to Meyer Steinberg et al. on Apr. 2, 1974, and Japanese Pat. Document 52-29704, issued to the Kajima Corp., and dated Nov. 10, 1972. In '358, the waste is treated, as by drying, heating, irradiating, and compacting, and is incorporated into a concrete mix. The aggregate is allowed to cure prior to treatment with a polymer. In the Japanese reference, granulated waste is mixed with mineral particles and combined with an asphalt binder.

Recycled plastic scrap is utilized in fabricating concrete blocks of predetermined shape and size, as seen in U.S. Pat. No. 4,427,818, issued to Richard C. Prusinski on Jan. 24, 1984. The process disclosed therein requires an intermediate step of heating the plastic.

Recycling waste, although in the form of incinerator ash, and not plastic scrap, is seen in the article taken from the Christian Science Monitor, as reported in Washington Home, issue of Oct. 3, 1991, and in U.S. Pat. No. 3,907,582, issued to C. Edward Walter on Sep. 23, 1975. The use of ground rubber tires and scrap plastic for application as aggregates in highway pavement is discussed in '582.

U.S. Pat. No. 3,941,607, issued to Albert Schuhbauer et al. on Mar. 2, 1976, discloses another example of using plastics as stiffening fillers to an aggregate building material.

Recycling plastics by fabricating articles therefrom is seen in U.S. Pat. Nos. 4,250,136, issued to Gary C. Rex on Feb. 10, 1981, and 5,073,416, issued to Roger W. Avakian et al. on Dec. 17, 1991. '136 discloses a laminated composite having small plastic beads. '416 teaches fixing plastic particulates in a matrix of chopped fibers.

None of the above inventions and patents, taken either singly or in combination, is seen to describe the instant invention as claimed.

SUMMARY OF THE INVENTION

It has been unexpectedly found that solid waste plastic, with less sorting and processing than required in the prior art, may be incorporated into cementitious building materials to provide a practical way of recycling plastic waste while reducing the cost and weight of bulk building materials. The building materials useful in the present invention are prepared and applied in a fluent state, and allowed to harden. Preferably, solid waste plastics may be incorporated into cementitious building materials containing a binder, such as portland cement, and filler, such as sand and/or gravel.

According to the present invention, the filler may be partially replaced and/or supplemented by particulate solid waste plastic materials. In many manufacturing processes, and in municipal waste streams, such plastics occur in abundance. These plastics are separated from undesirable materials, such as wood or metal, reduced to a suitable particle size, cleaned, dried, then mixed with binder and filler, such that the particles of plastic are evenly dispersed throughout the mixture. Water is added to the mixture, just before, during, or after the plastic particles, binder, and filler are mixed, and the resultant cementitious material may be used for substantially the same applications as if the plastic material was not present.

Advantageously, the density of the final building material is reduced. Expansion characteristics, particularly due to changing ambient temperature, are improved. The cost of the building material is reduced, since the material being replaced must typically be quarried, pulverized, and transported. Waste plastic, which presents an ever increasing disposal problem, is thus recycled without further encumbering waste treatment and storage facilities. Further, the present invention may be practiced with substantially all types of solid waste plastics, thereby drastically reducing the conventional need to: 1) sort these plastics, one from another, and 2) melt the separated plastics down.

Accordingly, it is a principal object of the invention to recycle solid waste plastic, without the need to sort any one type of solid plastic from another within the waste stream, by reducing the plastic to suitable particulate configuration, and mixing with a binder and filler to produce useful hardening cementitious building material.

It is another object of the invention to reduce the volume of earth-based materials necessary in hardening cementitious building materials by incorporating solid particulate waste plastic.

It is a further object of the invention to select and configure plastic waste so as to mix well, and cooperate with the properties of, earth-based, hardening building materials.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
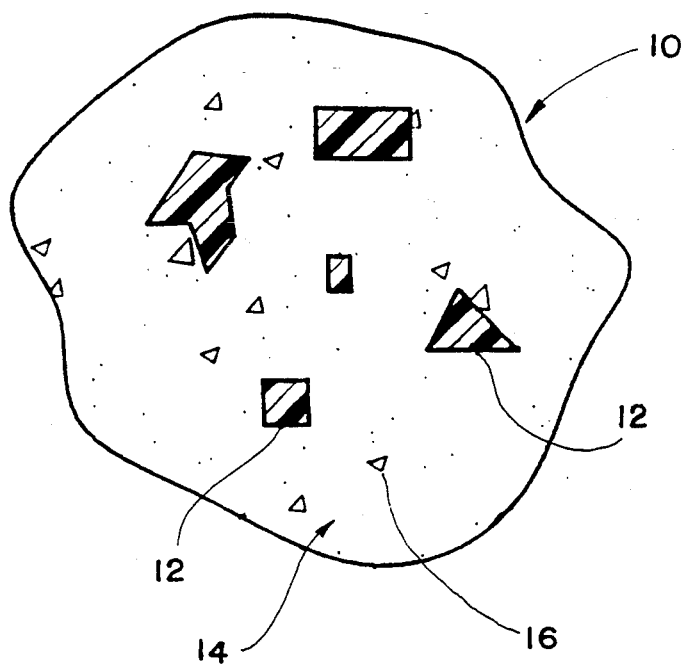
FIG. 1 is a cross sectional detail view of a building material produced according to the present invention.

The present invention comprises a practical vehicle for the recycling of plastic materials, and encompasses a cementitious building composition and a method of making the building composition which simultaneously recycles plastics. FIG. 1 shows an embodiment of the composition 10, wherein particulate solid waste plastic, or plastic scrap 12 is mixed with an earth-based, hardening building material having binder 14 and filler 16. The preferred binder 14 is portland cement. Portland cement as advantageously used in the present invention, is typically composed of the oxides of calcium, silicon, aluminum, and iron, which are combined in a quaternary system, conventionally defined in the art as composed of dicalcium silicates ($C_2S$), tricalcium silicates ($C_3S$), tricalcium aluminates ($C_3A$), and tetracalcium aluminoferrites ($C_4AF$) in well established ratios. Additional oxides of magnesium, titanium, sodium, potassium, and sulfur may be present in small amounts. The preferred portland cement for the purpose of this invention is of commercially available Type I or II, referring to normal or moderate compositions of argillaceous and calcareous materials.

To form a typical concrete, portland cement is admixed with mineral aggregate fillers such as sand and/or gravel in ratios of 1:5–1:10, cement to filler by volume. It is conventional to use sand and/or gravel, which is typically crushed stone sorted according to a predetermined preferred particle size, as the weight bearing member in these typical concretes. Both the weight bearing material and the binder material are derived from subterranean sources, or from synthetic materials having substantially the same principal properties of the original subterranean sources. The present invention recycles plastics by replacing up to 25% of the total volume of the concrete with waste particulate plastic. The ratio of portland cement to mineral aggregate fillers according to the present invention may thus be modified to 1:4–1:8, cement to filler by volume.

The source of the waste solid plastic useful in the present invention may be homogeneous waste, such as trimmings from a manufacturing process, or may be heterogeneous, such as that from a municipal or similar waste stream. If suitable plastic components are mixed with unsuitable non-plastic components, as will invariably occur in a municipal waste stream, then the suitable plastic material is separated from unsuitable material by any suitable means. More specifically, wood, glass, and metal is substantially separated and removed.

The waste solid plastic used in accordance with the present invention include non-expanded, thermosetting plastics. Both crystalline and amorphous plastics may be advantageously used in the present invention. Accordingly, the further separation of such plastics from each other is unnecessary, as substantially all solid plastic waste materials may be used. Examples of useful solid plastics commonly found in waste and scrap materials include, but are not limited to, ABS, acrylic, polystyrene, nylon, polyethylene, polypropylene, PVC, polycarbonate, and polyester, all of which are useful in the present invention. Polypropylene and polystyrene are given as examples, and are representative of the two classes of plastics, crystalline and amorphous, respectively.

Figure 2:
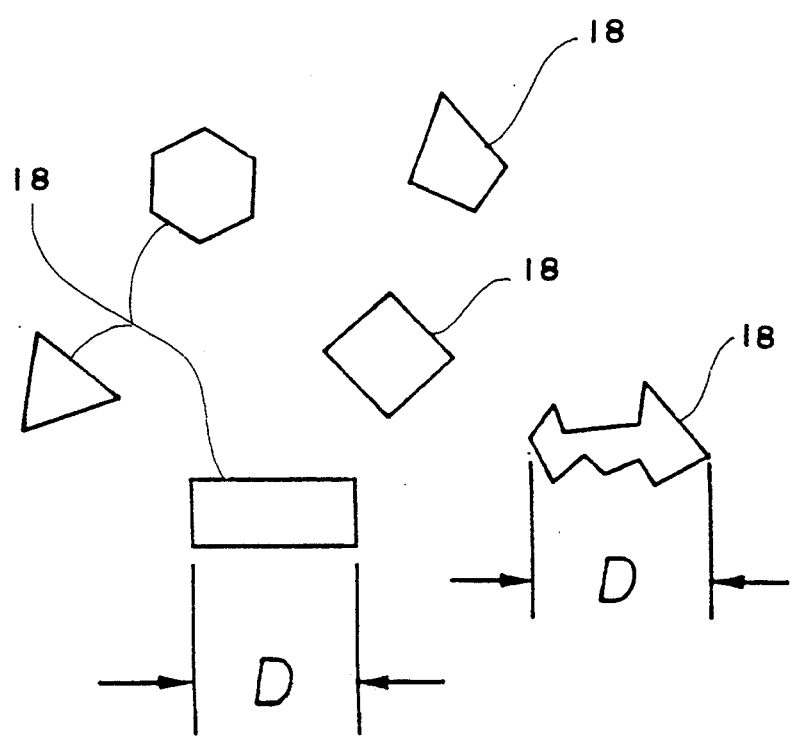
FIG. 2 is a diagrammatic detail view of plastic particles employed in the present invention.

The waste solid plastic or plastic scrap is reduced to particles of a suitable size. A conventional pelletizing scrap reducer (not shown) provides a suitable apparatus for accomplishing this reduction. As seen in FIG. 2, each particle 18 has a maximum dimension D, and is of random shape. D may be as large as fifteen millimeters. To enhance uniformity, and thus the ease of handling the plastic scrap and of predicting final characteristics of the building material, maximum dimension D is at least five millimeters. Thus, particles 18 will preferably have a maximum dimension D within the range between five and fifteen millimeters. The most preferred value of dimension D is ten millimeters.

To preserve desirable strength characteristics while simultaneously recycling a meaningful amount of waste plastic, the constituency of plastic scrap may make up from about ten to about twenty-five per cent, by volume, of the final prepared composition 10. The particulate plastic scrap 18 may be mixed into the binder and filler just after or during addition of water to the same binder and filler, and worked into a desired configuration. Alternatively and preferably, the particulate plastic scrap may be mixed with portland cement, along with sand and/or gravel in the dry state prior to adding water. With the addition of water, the binder, filler, and plastic scrap of the present invention provides a fluent aggregate which may be transported to its point of use, and poured or cast, as appropriate. Upon curing the fluent aggregate forms the desired cementitious building material 10.

A preferred method of making the cementitious building material 10 and simultaneously recycling plastic waste is summarized as follows:

1) Appropriate plastic material is identified in a waste source and selected for use.
2) Substantially all wood, glass, and metal components are removed from the waste source, leaving substantially plastic materials.
3) The plastic materials are reduced to particles of suitable dimensions, using a pelletizer grinder, or like shear and extrude apparatus, having extruding holes of about 5 to about 10 mm.
4) The resultant reduced particulate plastic is then cleaned, preferably with water and a mild detergent to remove unwanted chemicals.
5) The particulate plastic is allowed to dry.
6) A dry concrete mixture of one part by volume of portland cement and four to eight parts by volume filler of sand and/or gravel is prepared, or obtained premixed.
7) The particulate plastic of 5) and the mixture of 6) is admixed in a ratio of about 1:3 to 1:9 by volume, particulate plastic to cement and filler.
8) An appropriate amount of water is added to the plastic, cement, and filler mixture, and poured to form the cementitious building material directly, or transported in fluent form to the site of application by the truckload.

The cementitious building material obtained may be used to build streets, bridges, sidewalks, driveways, overpasses, curbs, runways, and foundations for buildings. This aggregate building material, when employed within its performance limits, has similar appearance and performance characteristics as building material not including plastic scrap. The total weight that must be transported and handled is reduced, and the burden upon waste disposal facilities is greatly eased.

EXAMPLE 1

To simulate a heterogeneous mixture of solid waste plastics, scrap polystyrene and polypropylene were obtained and admixed in equal measure. The scrap plastic was reduced to particles of ⅜" or less using a pelletizer grinder having extruding holes of ⅜", washed and allowed to dry. The resultant particulate plastic was then admixed with a commercially available binder/filler SANCRETE, from Texas Industries, which contains portland cement, sand, and gravel, in a volume ratio of 1:3, plastic to binder/filler. This mixture was hydrated and field cured to form a cement disk and aged for 168 days. Two cylindrical samples of 1.75" diameter were cut from the cement disk and tested for strength with the following results.

| Sample No. | Length | Area | Load | PSI | Corrected PSI |
|---|---|---|---|---|---|
| 1 | 2.0" | 2.4053 | 9,200 | 3825 | 3749 |
| 2 | 2.0" | 2.0453 | 9,150 | 3804 | 3728 |

The strength, as measured by corrected PSI for these test samples was within the normal operating specifications for this type of concrete without plastic. Further, polystyrene, an amorphous plastic, and polypropylene, a crystalline plastic, are representative of the plastics found in heterogeneous waste sources.

It is to be understood that the present invention is not limited to the embodiments described above, but encompasses any and all embodiments within the scope of the following claims.

I claim:

1. A method of recycling plastics by manufacturing a hardened cementitious building product, comprising the steps of:
   a) identifying solid plastic material in a waste source;
   b) removing substantially all wood, glass, and metal components from said waste source, leaving substantially solid plastic materials;
   c) reducing said solid plastic materials to particles, each particle having a maximum dimension which lies within a range of 5 to 10 mm using a shear and extrude apparatus;
   d) cleaning the particulate plastic;
   e) admixing, in a dry state, one part by volume of said particulate plastic with three to nine parts by volume of combined binder and filler to obtain a mixture, such that said particulate plastic is evenly distributed throughout said mixture;
   f) adding water to said mixture to form a fluent aggregate;
   g) forming a building product from said fluent aggregate; and
   h) curing said building product to form a hardened cementitious building product;
   wherein said binder consists essentially of portland cement, said filler is selected from the group consisting of sand, gravel, stone and combinations thereof, said solid plastic materials consist essentially of a mixture of crystalline and amorphous plastic, and said binder and filler are in a volume ratio of between 1:4 and 1:8, binder to filler.

2. The method of claim 1, wherein said cleaning in step d) is performed with water and a mild detergent to remove unwanted chemicals.

3. The method according to claim 1, wherein said solid plastic materials include plastics selected from the group consisting of ABS, acrylic, polystyrene, nylon, polyethylene, polypropylene, PVC, polycarbonate, and polyester.

4. The method according to claim 3, wherein said solid plastic materials include at least polystyrene and polypropylene.

5. The method of claim 1, wherein said shear and extrude apparatus has extruding holes of about 5 to about 10 mm in diameter.

6. The method of claim 5, wherein said pelletizer grinder has extruding holes of about 10 mm in diameter.

7. The method of claim 1, wherein after step f), said fluent aggregate is transported to a point of use.

8. The method of claim 7, wherein said fluent aggregate is poured at said point of use.

9. The method of claim 8, wherein said hardened cementitious building product is a static structure selected from the group consisting of streets, bridges, sidewalks, driveways, overpasses, curbs, runways, and foundations for buildings.

* * * * *